(12) United States Patent
Reudink

(10) Patent No.: US 7,970,377 B2
(45) Date of Patent: Jun. 28, 2011

(54) SYSTEMS AND METHODS FOR COORDINATING THE COVERAGE AND CAPACITY OF A WIRELESS BASE STATION

(75) Inventor: Douglas O. Reudink, Kirkland, WA (US)

(73) Assignee: Adaptix, Inc., Carrollton, TX (US)

( * ) Notice: Subject to any disclaimer, the term of this patent is extended or adjusted under 35 U.S.C. 154(b) by 0 days.

(21) Appl. No.: 12/651,820

(22) Filed: Jan. 4, 2010

(65) Prior Publication Data

US 2010/0172268 A1 Jul. 8, 2010

Related U.S. Application Data

(62) Division of application No. 11/097,095, filed on Apr. 1, 2005, now Pat. No. 7,668,530.

(51) Int. Cl.
*H04M 11/00* (2006.01)
(52) U.S. Cl. ......... 455/405; 455/446; 455/449; 379/133
(58) Field of Classification Search .................. 455/405, 455/446, 449, 67.1, 453, 442, 436, 437, 440; 379/113, 133
See application file for complete search history.

(56) References Cited

U.S. PATENT DOCUMENTS

| | | | | |
|---|---|---|---|---|
| 4,974,256 A | * | 11/1990 | Cyr et al. | 379/112.04 |
| 5,317,623 A | * | 5/1994 | Sakamoto et al. | 455/436 |
| 5,926,762 A | * | 7/1999 | Arpee et al. | 455/447 |
| 5,946,612 A | * | 8/1999 | Johansson | 455/405 |
| 5,946,620 A | * | 8/1999 | Schultz et al. | 455/435.1 |
| 5,960,354 A | * | 9/1999 | Einola | 455/454 |
| 6,014,565 A | * | 1/2000 | Bonta | 455/437 |
| 6,072,778 A | * | 6/2000 | Labedz et al. | 370/252 |
| 6,173,186 B1 | * | 1/2001 | Dalley | 455/446 |
| 6,308,064 B1 | * | 10/2001 | Green | 455/423 |
| 6,405,043 B1 | * | 6/2002 | Jensen et al. | 455/446 |

(Continued)

FOREIGN PATENT DOCUMENTS

WO WO-02/43026 5/2002

(Continued)

OTHER PUBLICATIONS

"Field Strength and Its Variability in VHF and UHF Land-Mobile Radio Service" by Yoshihisa Okumura, et al., Review of the Electrical Communications Laboratory, vol. 16, No. 9-10, Sep.-Oct. 1968.

(Continued)

*Primary Examiner* — Minh D Dao
(74) *Attorney, Agent, or Firm* — Fulbright & Jaworski L.L.P.

(57) ABSTRACT

A communications base station is installed at a selected new location and the base station, prior to going "on line" monitors the wireless traffic from other base stations within interference range of the new base station's coverage area. The new base station also monitors the wireless traffic between mobile devices within its coverage area and these other base stations. Based upon these monitored conditions, as well as other known conditions, the new base station then determines the transmitting parameter configuration it should imply in order to achieve a desired optimization between capacity and coverage area. After the new base station is on line, a central control can monitor the entire network to determine if any additional changes are necessary and if so the new transceiver, or any other transceiver, can be instructed to monitor itself with respect to interference and to take corrective action to improve overall network coverage and capacity.

18 Claims, 3 Drawing Sheets

U.S. PATENT DOCUMENTS

| | | | |
|---|---|---|---|
| 6,421,005 B1 | 7/2002 | Weaver et al. | |
| 6,496,697 B2 * | 12/2002 | Jensen | 455/447 |
| 6,496,698 B2 * | 12/2002 | Jensen | 455/447 |
| 6,829,491 B1 * | 12/2004 | Yea et al. | 455/560 |
| 6,985,738 B1 * | 1/2006 | Ekstam et al. | 455/452.1 |
| 7,035,632 B2 * | 4/2006 | Gutowski | 455/423 |
| 7,076,252 B1 * | 7/2006 | Hirvonen | 455/446 |
| 7,099,674 B2 * | 8/2006 | Diao et al. | 455/453 |
| 7,228,142 B2 * | 6/2007 | Natori et al. | 455/456.3 |
| 7,675,311 B2 * | 3/2010 | Khandros et al. | 324/765 |
| 2002/0151308 A1 | 10/2002 | Baba et al. | |
| 2005/0256694 A1 * | 11/2005 | Taylor | 703/22 |
| 2006/0234640 A1 * | 10/2006 | Hirvonen | 455/67.11 |
| 2008/0182580 A1 * | 7/2008 | Laroia et al. | 455/440 |
| 2010/0041391 A1 * | 2/2010 | Spivey et al. | 455/425 |

FOREIGN PATENT DOCUMENTS

WO    WO-03/055251    7/2003

OTHER PUBLICATIONS

Hata, "Empirical Formula for Propagation Loss in Land Mobile Radio Services," IEEE Transactions on Vehicular Technology, vol. 29, No. 3, Aug. 1980.

International Search Report & Written Opinion issued for PCT/US2006/011272 dated Sep. 4, 2007.

The Extended European Search Report issued for EP06739829.7-2412, dated May 7, 2010, 8 pages.

* cited by examiner

SYSTEMS AND METHODS FOR COORDINATING THE COVERAGE AND CAPACITY OF A WIRELESS BASE STATION

CROSS-REFERENCE TO RELATED APPLICATIONS

This Application is a Division of application Ser. No. 11/097,095 filed on Apr. 1, 2005 entitled "SYSTEMS AND METHODS FOR COORDINATING THE COVERAGE AND CAPACITY OF A WIRELESS BASE STATION," the disclosure of which is incorporated herein by reference.

STATEMENT REGARDING FEDERALLY SPONSORED RESEARCH OR DEVELOPMENT

Not applicable.

REFERENCE TO A COMPACT DISK APPENDIX

Not applicable.

TECHNICAL FIELD

This Invention relates to wireless communication and more particularly to systems and methods for increasing base station coverage and capacity in a wireless network, and even more particularly to such methods and systems for placement of wireless transceivers within a communication network.

BACKGROUND OF THE INVENTION

One problem experienced in wireless communication systems is locating base stations. Once a base station (transmitter/receiver) is positioned in a coverage area it is important to be able to set its respective parameters in order to provided the desired coverage or capacity.

In this context, coverage is the geographical area covered by the signals to or from the base station while capacity relates to the amount of data that can pass through the base station to or from mobile devices. Base stations can be optimized for either coverage area or capacity (throughput). Typically, such optimization has been accomplished by using a sophisticated set of tools that are available to the wireless network designer. These tools would provide signal propagation models to the designer for use in calculating coverage areas for a particular base station. The designer would also estimate the interference that could result with respect to mobile devices communicating with a different base station some distance away, so these may or may not be on the same channel.

In some wireless networks the various base stations would use different channels or frequencies to avoid interference issues. Wireless network frequency planning is used to avoid, or minimize, such interference problems between adjacent and nearby base stations.

In newer wireless systems, such as, for example, Ofdm and Ofdma, the tendency is to overlap frequencies and channels across base stations and to eliminate interference by assigning different combinations of sub-channels (sub-carriers) to different mobile devices communicating at the same time. These modulation schemes allow variable data rates and variable amounts of robustness in terms of being able to tolerate the interference. The ideal system is one in which a base station can serve a high number of mobile devices with no interference between devices. In order to achieve such an ideal system it is important that each communicating mobile device has a strong signal. If on the other hand there are two mobile devices each on the edge of coverage with two base stations and if propagation were uniform those mobile devices would most likely experience interference. This interference would reduce the data rate for those devices in order to protect the integrity of the data.

Turing to the problem of location of a new transmitter/receiver (herein called a transceiver) the network designer, as discussed above, decides on a location, has the transceiver erected and installed and then tunes it up by adjusting the power level, the elevation angle of the antenna, etc. in accordance with the precalculated plan for this transceiver. Once these adjustments are made, the transceiver is turned on and "sees what actually happens". The technician can then readjust the power levels, adjust the down tilt of the antenna, and possibly swap out the antenna with an antenna having a different azimuth angle. If the transceiver continues to cause interference, or not properly cover the designated area network adjustments might have to be made, or the power level reduced further. In some instances the adjacent base stations also need to be read.

BRIEF SUMMARY OF THE INVENTION

A communications base station is installed at a selected new location and the base station, prior to going "on line" monitors the wireless traffic from other base stations within interference range of the new base station's coverage area. The new base station also monitors the wireless traffic between mobile devices within its coverage area and these other base stations. Based upon these monitored conditions, as well as other known conditions, the new base station then determines the transmitting parameter configuration it should apply in order to achieve a desired optimization between capacity and coverage area.

After the new base station is on line, a central control can monitor the entire network to determine if any additional changes are necessary and if so the new transceiver, or any other transceiver, can be instructed to monitor itself with respect to interference and to take corrective action to improve overall network coverage and capacity.

In one embodiment, operating power levels are gradually raised as the new base station comes on line so as to minimize interference. In addition, if desired, the new base station can automatically adjust its antenna beams in elevation, pointing angle and beam width.

In one embodiment, the new base station would determine the most optimum operating parameters for its use, and if those parameters cause interference in the network then a central control will assist in the adjustment of the network to achieve the optimization of the entire network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
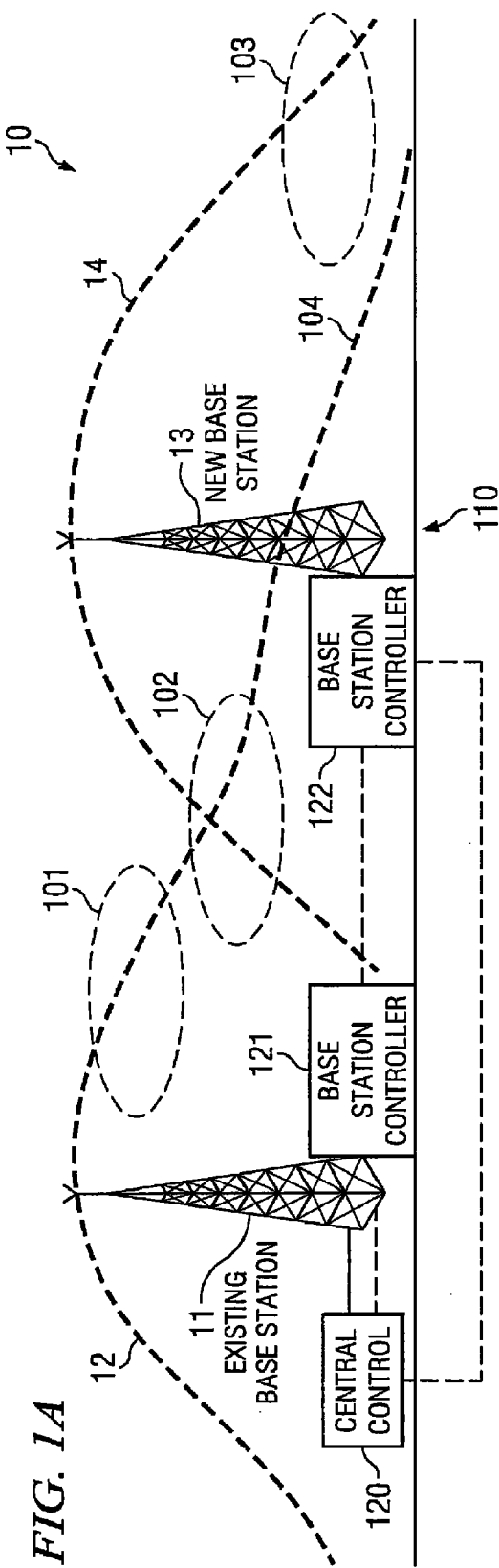
FIG. 1A shows one embodiment of a wireless network where a base station is being added.
FIG. 1B is a chart illustration of the before and after characteristics at certain locations within the coverage area of the wireless network.

FIG. 1A shows wireless network 10 initially having one base station 11 with coverage area defined by dotted line 12. Transmission and other control to/from base station 11 is controlled by base station controller 121 in conjunction with central control (NOC) 120 which could be co-located with a base station, if desired. Contained within base station controller 121 is a database and at least one software program which controls transmission to/from the base station as is now well known. As will be seen, while transmission from base station 11 can, in theory, reaches out to point 104, transmissions to and from that location would most probably be unsatisfactory because of low energy. Since mobile devices, such as cell phones, PDAs, computers, two-way pagers and the like, do not transmit with as much energy as does a base station, most wireless devices would not be able to transmit as far as does the base station and thus the actual coverage area would be even less than shown by dotted line 12.

In FIG. 1A, there are three points of interest, 101, 102, and 103, that will be examined. However, the concepts that we will be discussing are applicable over the entire coverage area, varying only in degree. Also note that while certain network types, such as Ofdm and Ofdma networks, will be discussed, the concepts discussed herein can be applied to many network types.

An Ofdm network contains many (256-1024 being typical) orthogonal carriers. In such a system, subcarrier aggregations are formed (typically in the order of 16 to 32) for each communication connection in order to decrease interference and thus increase capacity (throughput). In order to support many more active users, the subcarriers may be time-shared and reassigned to different mobile stations on a frame by frame basis with a typical frame being 5 ms. In such systems, it is possible for several mobile devices to share some (but not all) of the carriers used by the other devices. If the subcarriers that make up a particular connection are properly selected, interference between the mobile devices is reduced to a minimum. A more complete description of an Ofdm system is contained in "Ofdm for Wireless Multimedia Communications" by Richard D. J. Van Nee and Ramjee Prasad (ISBN 0890065306) which is hereby incorporated by reference herein. In addition, the following references, which are hereby incorporated by reference herein, are useful for calculating propagation loss: "Field Strength and Its Variability in VHF and UHF Land-Mobile Radio Service," by Yoshihisa Okumura, et al., *Review of the Electrical Communications Laboratory*, Vol. 16, No. 9-10, September-October 1968 and Hata "Empirical formula for propagation loss in Land Mobile radio services," IEEE Transactions on Vehicular Technology, Vol. 29, No. 3, August 1980.

When a need arises for a new base station, either by an increase in wireless usage in an area or by the construction of a structure blocking existing transmissions, engineering calculations are made to determine the most effective possible sites. These calculations take into account a myriad of factors, including the amount of added capacity and amount of added coverage area desired. However, while the engineering factors are important, other factors, such as availability of land and the ability to obtain governmental and regulatory approvals must also be considered. Once the new location, for example location 110, FIG. 1, is decided upon for a base station (transceiver), the base station is constructed at that site.

The procedure that has been followed in the past when a base station is ready to go online is that the antennas are set to achieve the calculated distances and radiation pattern and the transceiver "lights up" (goes online) and begins to transmit. Calculations are then made as to interference and other factors. Adjustments are than made to the power levels, frequencies are changed, antenna tilt (either physically or electronically) as well as other factors are adjusted to make sure the new base station does not interfere with, for example, transmission to/from base station 11. Often the results are confirmed by extensive and tedious drive testing.

Based upon the concepts discussed herein, new base station 13 is constructed at location 110, but prior to coming online, new base station (NBS) 13 performs at least two functions. The first function is that it monitors the wireless traffic from other base stations within interference range of the coverage area of the transceiver. The second function performed is to monitor wireless traffic between the mobile devices within its coverage area of its base station and other base stations to determine what level of coverage is available.

For example, as shown in FIG. 1B, base station 13 would monitor traffic in the region of 101 and find that there is good coverage from existing base station 11 and into area 101 there would possibly be interference between the two base stations.

Base station 13 would monitor region 102 and determine that there is marginal coverage from transceiver 11 that with the conclusion area 102 is an area that base station 13 should cover. Base station 13 also looks at region 103 and determines that wireless devices in that area are not being properly served with the conclusion that area 103 would be a good coverage area for transceiver 13.

This procedure is followed for a period of time until new base station 13 understands the coverage areas and the transmissions from different communication devices within its area. At that point, base station 13 "lights up" and goes online Once online, base station 13 can monitor the traffic to see if, in fact, there is an unanticipated interference. In some situations central control 120, which can be part of any base station or could be a separate stand alone control center, can receive signals and measurements from a plurality of base stations and can operate to send adjustment commands to one or more of the base stations asking the base stations to change their coverage area power level, frequency, or even their mode of operation. Note that because traffic patterns change by time of day and between weekday and weekend, base station 13 could be setup as an average "best effort" configuration. Also note that base station 13 (or any base station using the concepts discussed herein) can maintain in memory sets of parameters suitable for such different times (busy hours, day/night, weekday, weekend, emergency, etc.) and can then adjust the parameter of the BS to best suit those times.

After new base station 13 has come online other base stations could, if desired, perform the same monitoring functions and adjust themselves so as to optimize the network. This optimization can be on a periodic basis or under certain triggers such as when a certain number of calls are dropped or when a certain number of mobile stations report high interference levels. Control would be required between base stations so that the base stations do not interact with each other to cause a destabilization of the network.

Figure 2:
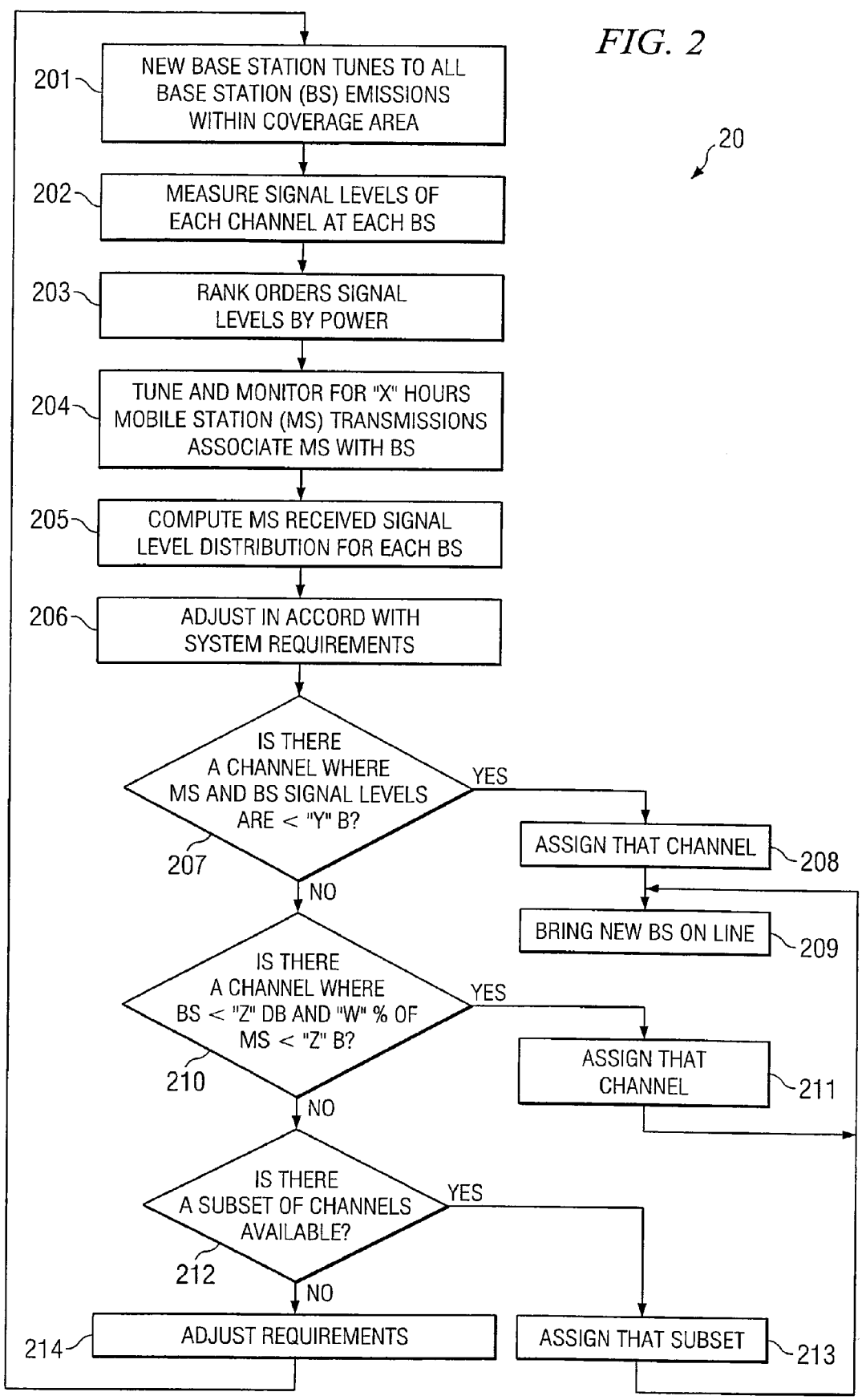
FIG. 2 is a flow chart illustrating one embodiment of the invention.

FIG. 2 shows one embodiment 20 of a flow chart illustrating the "plug and play" nature of the addition of a new base station and illustrates one example of bringing a new base station on line. Process 201 controls the New Base Station (NBS) so that it tunes to all the base station emissions within the coverage area. The NBS tunes to the other BS frequencies and/or timeslots. This is done to begin the mapping process with respect to signals and interference in and around the NRS. The NBS measures received power from all base stations where the power is above the noise threshold or other set thresholds. This is necessary so that the NBS knows what devices are in its coverage area and what frequencies are involved. Some of the information obtained by the NBS comes from central control (NOC) 120 and is used to calculate:

a. a path loss to the NBS from each base station (BS);

b. a predicted path loss of a mobile station (MS) within the NBS range to each BS (formula); and c. a path loss (PL) vs distance function (this may be angle dependant) for an assumed MS in communication with the NBS (formula, model).

Process 202 measures the signal levels of each channel at each base station. A log is made of the frequencies and power levels that are received at the NBS from the nearby BSs.

Process 203 rank orders the signal levels by power or by any other parameter desired. For example, a power rank order list is compiled which provides a first indication of what channels the BS may select, the weakest signals being the most likely selections.

Process 204 tunes and monitors transmission mobile station transmissions for X hours and associates each mobile station with a particular base station. A data set is collected by monitoring and aggregating the received powers from a host of MS. The NBS knows from the NOC the channels and their associated BS locations. This monitoring is so that the new base station gets a picture of the transmissions to and from mobile stations and who they are communication with and can take from a few hours to several days to obtain a fair picture of wireless traffic. The actual time depends on the accuracy required.

Process 205 computes the mobile station receive signal level distribution for each base station by calculating the power received at a MS and from a MS and BS at any given distance from the NBS. The MS associated with each BS is knowable because of unique frequencies, timeslots and other pilot addressing schemes as provided by a standard (e.g., IEEE 802.16a). For each BS there will be a distribution of MS signal levels due to their various locations. The NBS calculates the expected maximum distance that a MS can be from the NBS based on the NBS potential available power antenna gain, height, terrain parameters, etc. The NBS also calculates the expected distance of a MS from the NBS where the Signal to Interference Ratio (SIR)=1. That is a MS receives equal power from the NBS and the strongest existing BS on the same channel.

Figure 3:
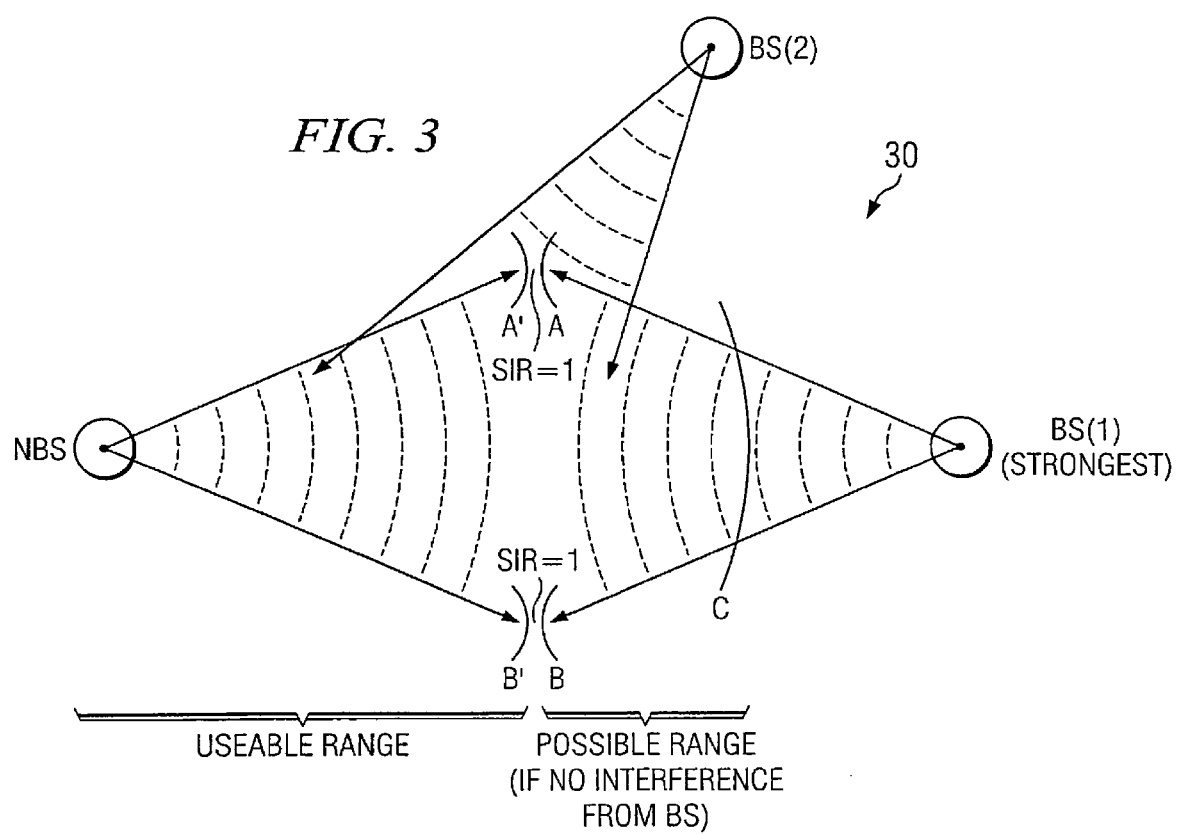
FIG. 3 is an illustration of one embodiment of the invention demonstrating coverage areas.

This is shown by illustration 30, FIG. 3. The strongest BS is BS (1) and range A'-B' is the useable range where SIR=1 (i.e. the signal and interference are equal). Range C would be the range of the NBS if interference were not a factor. Note that range C will vary based on the transmitting parameters, (power, frequency, tilt, pattern, polarization, etc.) of the NBS, as well as terrain, foliage, buildings, etc.

In process 206 the operator has previously input a set of goals (e.g., increase capacity in a certain area). This calculates into ideal settings for constant W, Y and Z to be used in the signal flow below. Process 206 adjusts the NBS in accordance with these system goals or requirements. This step requires a service provider assisted goal, for example. A goal could be to: Expand the range until SIR at mobile equals X dB (0, +3, +6, negative is generally not useful as the other BS should handle the MS unless that BS is full). An alternative goal could be to: Expand the range until a predetermined amount of traffic is acquired within a given range. Further optimization can be achieved by adjusting sector pattern and downtilt. For example, the NBS can expand in beamwidth to increase traffic or it can increase downtilt to reduce interference inside the coverage area.

Process 207 determines if there is a channel where mobile station and signals are below a certain dB level Y. The parameter Y may be set very low so that the most ideal channel is found. If the answer is yes, then at least temporarily base station 13 assigns itself that channel via process 208 and could at this point come online process 404, at least with respect to that channel. In this context, it could be a channel or a set of sub-channels or any combination thereof.

If the criteria of process 207 cannot be met, a reduced requirement is tested. In process 210 if certain percentage W of the MS meet the criteria, that channel is assigned (process 211) and the BS brought online at process 209.

If the answer is no in process 210 (i.e., even the reduced criteria are not met) then process 212 determines if there is a subset of channels available. If the answer at process 210 is yes, the base station will assign itself those subsets via process 213, and a reduced capacity HBS is brought online (process 209). If the answer is no, at process 212 then a new set of requirements are rendered (new Y, Z and W in our example) via process 214 and processes 406-414 are repeated until the NBS is operational.

The new requirement could, for example, be a change of transmission parameters from other BSs under control of NOC 120 by adjusting BS power and antenna parameters to reduce interference or increase system capacity. Also, the NBS can refine its estimate of pathloss based on ranging information from MS after it "lights up". This is based on the fact that a MS will choose a BS based on the strongest pilot signal the MS receives, the NBS can determine from time of arrival data (distributions) the range of actual MS. Accordingly, the NBS can adjust power and/or antenna parameters to more closely match the desired coverage.

The logic flow may readily be extended (line 220) after the NBS is turned on to monitor, for example, the increased traffic versus the transceiver signal power or versus antenna downtilt.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for adding a new base station to a wireless communication network, said network providing wireless communications to a coverage area, said network having multiple base stations; said method comprising:
   said new base station, upon activation and before coming on-line with its own transmission, sampling for a period of time existing transmission data to and from base stations within said new base station's proposed coverage area; and
   deriving, under control of said new base station, a set of transmission parameters calculated to achieve criteria established for said base station, said derived transmission parameters based upon said sampling.

2. The method of claim 1 further comprising:
   adjusting said derived transmission parameters after said new base station has been activated using said derived transmission parameters to take into account anomalies caused by said activation of said new base station.

3. The method of claim 2 wherein said anomalies are selected from the list comprising: traffic increases, traffic balances, data losses experienced, increase in call drops, increase in interference levels.

4. A wireless communication system comprising:
   at least one established transceiver for bi-directional communication between said transceiver and a plurality of mobile devices within a transmission area of said transceiver;
   a newly added transceiver positioned at a location such that the transmission area of said newly added transceiver overlaps, at least partially, said transmission area of said established transceiver; said newly added transceiver comprising:
      means for selecting transmitting parameters to achieve a desired coverage criteria, said selecting based upon transmission parameters as measured from said bi-directional communication between said established transceiver and said plurality of mobile devices within said transmission area of said established transceiver.

5. The wireless communication system of claim 4 further comprising:
   means for bringing said newly added transceiver online using said selected transmitting parameters.

6. The wireless communication system of claim 5 further comprising:
   means, at said established transceiver, and operable after said newly added transceiver is online for adjusting the transmission parameters of said established transceiver based upon measured bi-directional communication within said overlap area.

7. The system of claim 5 further comprising:
   means for storing said measured bi-directional communications; and
   means for changing said selected transmitting parameters to match anticipated transmissions within said transmission area, said anticipated transmissions bases on said stored bi-directional communications.

8. A wireless communication method, said method comprising:
   transmitting data to an established base station on a first channel, said data transmitted on said first channel within the coverage area of a new base station; and
   receiving data from said new base station on a second channel, said second channel selected by said new base station based, at least in part, on:
   sampling performed by said new base station, for a period of time, data transmitted on said first channel between said mobile station and said established base station.

9. The method of claim 8 wherein said second channel is further selected by said new base station based on:
   sampling performed by said new base station, for a period of time, data transmitted by at least one other mobile station and at least one other established base station within the coverage area of said new base station.

10. The method of claim 8 further comprising transmitting ranging signals from said mobile station to said new base station and, in response to said transmitting, receiving data transmitted from said new base station according to updated transmit parameters.

11. The method of claim 10 wherein said updated transmit parameter comprises an adjusted transmit power.

12. The method of claim 10 wherein said updated transmit parameter comprises an adjusted antenna tilt.

13. The method of claim 8 wherein said sampling comprises measuring the power at which said data is transmitted from said mobile station to said established base station.

14. A wireless communication method, said method comprising:
   transmitting, to a new base station, information indicative of the channels used for communication between a plurality of mobile stations and a plurality of established base stations within the coverage area of said new base station;
   receiving, from said new base station, information related to measurements of bi-directional communication between said established base stations and said mobile stations within said coverage area of said new base station; and
   in response to said receiving, transmitting to said new base station, an instruction to update transmit parameters for data transmission from said new base station and at least one of said mobile stations.

15. The method of claim 14 further comprising:
   in response to said receiving, further transmitting to at least one of said established base stations, an instruction to update transmit parameters for data transmission from said at least one of established base stations and at least one other of said mobile stations.

16. The method of claim 14 wherein said information sufficient to determine, by said new base station, which of particular mobile stations are communicating with particular base stations on particular channels.

17. The method of claim 14 wherein said updated transmit parameter comprises an adjusted transmit power.

18. The method of claim 14 wherein said updated transmit parameter comprises an adjusted antenna tilt.

* * * * *